US005753571A

United States Patent [19]
Donohue

[11] Patent Number: 5,753,571
[45] Date of Patent: May 19, 1998

[54] LEAD AND CADMIUM-FREE ENCAPSULANT COMPOSITION

[75] Inventor: Paul C. Donohue, Wilmington, Del.

[73] Assignee: E. I. du Pont de Nemours and Company, Wilmington, Del.

[21] Appl. No.: 798,746

[22] Filed: Feb. 13, 1997

[51] Int. Cl.[6] .............................. C03C 3/064; C03C 8/14
[52] U.S. Cl. ............................. 501/77; 501/20; 501/32; 501/17; 501/79
[58] Field of Search .............................. 501/17, 20, 32, 501/77, 79

[56] References Cited

U.S. PATENT DOCUMENTS

| | | | |
|---|---|---|---|
| 5,252,521 | 10/1993 | Roberts | 501/17 |
| 5,378,408 | 1/1995 | Carroll et al. | 501/32 |
| 5,468,695 | 11/1995 | Carroll et al. | 501/79 |
| 5,491,118 | 2/1996 | Hormadaly | 501/77 |
| 5,629,247 | 5/1997 | Prunchack | 501/79 |

Primary Examiner—Karl Group

[57] ABSTRACT

A lead and cadmium-free encapsulant glass composition consisting essentially of by weight %, 60–80% $Bi_2O_3$, 6–14% $SiO_2$, 5–12% $B_2O_3$, 5–10% $Al_2O_3$ and 0–4% ZnO.

8 Claims, No Drawings

LEAD AND CADMIUM-FREE ENCAPSULANT COMPOSITION

FIELD OF THE INVENTION

The invention relates to a lead and cadmium-free encapsulant composition. In particular, the invention relates to low melting glass compositions which are suitable for use as encapsulants for electronic circuits.

BACKGROUND OF THE INVENTION

Hybrid circuits are encapsulated to insure resistor durability in humid atmospheres. Furthermore, manufacturers prefer glass encapsulation to protect the conductor metals from long term corrosion.

The encapsulant system must exhibit several features which are difficult to achieve together. It must form a bubble-free seal at low enough firing temperature to prevent shift of the underlying resistors. If the glass flows too much, it will diffuse into the resistor and shift the value upward. If it does not flow enough, it will not seal. The organic vehicle necessary for screen printing must burn out at this low temperature. Thus an ideal encapsulant should screen print smoothly and rapidly with a vehicle which is decomposable at a low enough temperature to allow the glass to flow sufficiently to form a seal, but not so much as to shift the resistor.

Various glasses having low softening temperature (Ts) have been used extensively as encapsulants for electronic circuits. These glasses usually have had a high Temperature Coefficient of Expansion (TCE) which, unless it is carefully matched to the adjacent circuit layers, can set up substantial mechanical stresses which can lead to system failures.

An encapsulant, among its other functions, provides protection from the environments to the underlying electronic circuit. To fulfill this function the encapsulant should have sufficient durability to survive the environments encountered in the production and the daily use of the electronic circuits. Most low softening point glasses have poor durability in acids and bases and their durability tends to degrade as the Ts becomes lower. Although the majority of electronic circuits are not expected to be used in very acidic or basic environments, some are exposed to water and basic or acidic environments during the production. The final stage in some fabrication processes involves an additional encapsulation by an organic polymer, e.g., an epoxy. Some epoxy resins contain an amine which can exert a basic environment in a humid atmosphere.

In addition, non toxic lead-free and cadmium-free encapsulants which are low melting, moderate in expansion, durable and provide excellent wetting are needed.

Consistent with efforts to reduce or eliminate lead and cadmium from broad categories of products containing glass frits, the present invention renders a non toxic, lead-free and cadmium-free glass encapsulant. In addition, the present invention provides a lead-free and cadmium-free encapsulant glass with improved stability toward acid fluxes commonly used to attach solder to adjacent conductive metal tabs.

SUMMARY OF THE INVENTION

The invention is directed in its most general form to a lead and cadmium-free encapsulant glass composition consisting essentially of by weight %, 60–80% $Bi_2O_3$, 6–14% $SiO_2$, 5–12% $B_2O_3$, 5–10% $Al_2O_3$ and 0–4% ZnO. The glass composition may be dispersed in an organic medium to form a thick film paste composition.

DETAILED DESCRIPTION OF THE INVENTION

Encapsulant glasses for thick film hybrid circuits must perform several functions: they must melt and form a glass film at as low a temperature as possible to prevent flow of the glass via diffusion into underlying resistors. If too much glass diffuses into the resistor, the resistance will change as measured by a resistance shift upward from the value measured before encapsulation. If the shift is too great, laser trimming to adjust the resistance value upward to the required value will not be possible.

The encapsulant of the present invention has been designed with a sufficiently low Ts to minimize resistor shift to <3% of the original value, as shown in Table 1. This is within an acceptable range to allow laser trimming up to the required value. For further explanation, to make all the resistors have the same design value for proper circuit performance, a laser is used to trim resistances up by removing (vaporizing) a small portion of the resistor material. The stability of the trimmed resistor is then a measure of the fractional change in resistance that occurs after laser trimming. Low resistance change—high stability—is necessary so that the resistance remains close to its design value for proper circuit performance.

The degree of flow necessary for good sealing is a function of the Ts. In thick film form, generally a temperature about 50 degrees higher that the Ts is preferred to produce sufficient flow of the glass to form a smooth glaze. To minimize resistor shift, peak firing temperatures are preferred to be about 600° C. and not exceed 620° C. Thus, the preferred Ts of the present invention should not exceed 570° C. Although, if greater acid durability is needed a Ts of 590° C. may be used in some applications.

Although the firing temperature must be low enough to minimize shift, it must be high enough for the glass to flow and seal the underlying resistor. The sealing is especially important to minimize resistor drift on exposure to high temperature and humidity after laser trimming.

Table 1 shows the shifts and laser trim drifts for an encapsulant of the present invention as compositionally defined in Example 1 and fired at a 620° C. peak over thick film resistors:

TABLE 1

| Resistor, Ohms/sq | % shift | % drift, aged 1000 hrs | |
|---|---|---|---|
| | | 150° C. *ambient | 85° C. *85% |
| 10 | 2.5 | 0.24(0.52) | 0.22(0.70) |
| 1000 | 0.4 | 0.10(0.14) | 0.19(0.23) |
| 100000 | -2.7 | 0.01(-2.6) | 0.27(2.15) |

(*)relates to relative humidity.
( )indicates unencapsulated drifts.

Drift on Aging at 150° C. in dry air and held at that temperature for a specified time (usually 1,000 hours). At the end of the specified time, the resistor is removed and allowed to cool to room temperature. The resistance is again measured and the change in resistance calculated by comparison with the initial resistance measurement.

Hermeticity—This test is performed in the same manner as the preceding Drift on Aging Test, except that the air within the heating cabinet is maintained at 85% relative humidity (RH) at 85° C. (85% RH/85° C.).

Generally higher softening temperature glasses are more durable in acid solutions than low softening. Thus, there is a trade-off to minimize softening temperature and maximize acid durability. The glasses of this invention were prepared with varying levels of ingredients and it was found that ZnO and $Al_2O_3$ contents are most important.

As found herein, preferred high corrosion resistance was best exhibited with zero to low loadings of ZnO and high loadings of $Al_2O_3$ and a low softening point was best exhibited with high loadings of ZnO and low loadings of $Al_2O_3$. As used herein the term "low" is defined as a content of 0–4 wt. % basis total composition and the term "high" is defined as a content of 5–10 wt. % basis total composition.

Consequently, the preferred composition ranges of the present invention combines very low or zero ZnO and high $Al_2O_3$ content. If the $Al_2O_3$ content is too high, then the Ts will become too high. If the ZnO content is too high, acid durability will be lost.

The $Bi_2O_3$ component is contained in the glass of the invention in amounts ranging from 60–80% by weight. It is preferred that the $Bi_2O_3$ be used within the range of 63–75% by weight.

The $B_2O_3$ component is contained in the glass in amounts ranging from 5–12% by weight and preferably 8–11 wt. %. The $B_2O_3$ serves an important function in the glass in that it contributes to lowering the softening point.

The $SiO_2$ is important in the composition of the invention because of its contribution to the durability of the glass i.e., insoluble in acid or water. In order to avoid making the softening point of the glass too high, the amount of $SiO_2$ should not exceed 14%. It is preferred that $SiO_2$ be present within the composition of the invention each within the range of 9–12%.

In addition to the above-described essential components of the glass, the composition may optionally contain 0.5–2% by weight $Cr_2O_3$. The $Cr_2O_3$ functions in the glass mainly as a pigment.

The preparation of such glass frits is well known and consists, for example, of melting together the constituents of the glass in the form of the oxides of the constituents and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barium oxide will be produced from barium carbonate, etc. The glass is preferably milled in a ball mill with water to reduce the particle size of the frit and to obtain a frit of substantially uniform size. Although particle size is not critical, the preferred range is 2–5 micron average.

The glasses are prepared by conventional glass making techniques by mixing the desired components in the desired proportions and heating the mixture to form a melt. As is well known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. The melt is heated at the peak of 1200° C. for a period of 1½ hours. The melt is then poured into cold water. The maximum temperature of the water during quenching is kept as low as possible by increasing the volume of water to melt ratio. The crude frit is then ball milled in water for 3–24 hours in alumina containers using alumina balls.

After discharging the milled frit slurry, excess water may be removed by decantation and the frit powder is air dried at 150° C. The dried powder is then screened through a 325-mesh screen to remove any large particles.

It is preferred that the encapsulant glass compositions of the invention contain only the metal oxides discussed herein above. Nevertheless, it is recognized that small amounts, up to 5% wt., of other glass modifying oxides such as alkali metal oxides and alkaline earths can be added to the encapsulant compositions without changing their essential character.

The above-described procedure illustrates preparation of the glass of the invention by melting a mixture of the various metal oxides in the proportions set out herein above. However, the glass may also be made by mixing two or more amorphous glasses which together contain the metal oxides in the appropriate proportions or they may be made by mixing one or more amorphous glasses together with metal oxides to obtain the appropriate proportions of the metal oxides.

In preparing a thick film paste using the glasses of the present invention suitable for screen printing over circuits, the glass must be combined with appropriate fillers and organic medium. The glass may also be applied as a green tape.

When the encapsulant is applied by screen printing, the particles thereof are mixed with an inert liquid medium (vehicle) by mechanical mixing (e.g., on a roll mill) to form a pastelike composition having suitable consistency and rheology for screen printing. The latter is printed as a "thick film" in the conventional manner.

The main purpose of the organic medium is to serve as a vehicle for dispersion of the finely divided solids of the composition in such form that it can readily be applied to ceramic or other substrates. Thus the organic medium must first of all be one in which the solids are dispersible with an adequate degree of stability. Secondly, the Theological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the Theological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of liquids can be used as organic medium. The organic medium for most thick film compositions is typically a solution of resin in a solvent frequently also containing thixotropic agents and wetting agents. The solvents usually boil within the range of 130°–350° C.

Suitable solvents include kerosene, mineral spirits, dibutylphthalate, butyl carbitol, butyl carbitol acetate, hexylene glycol and high boiling alcohols, alcohol esters and terpineol. Various combinations of these and other solvents are formulated to obtain the desired viscosity and volatility.

By far the most frequently used and a frequently preferred resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate and polyalpha methystyrene can also be used. The invention extends itself to water-based systems since the glass is water millable. Resins suitable for water-based systems are: polyvinylpyrrolidone, copolymers with PVA, hydroxyethylcellulose, methylcellulose, hydroxypropylcellulose, sodium carboxymethylcellulose, polyvinylacetate, and neutralized acrylic polymers. Suitable co-solvents suitable for water-based systems are: butyl cellosolve, tetraethylene glycol, butyl carbitol, butyl carbitol acetate, ethylene glycol, glycerol, ethylene glycol diacetate, carbitol acetate, n-methyl pyrrolidone, hexylene glycol, diproplyleneglycol monomethly ether, 1-methoxy-2-propanol acetate, propylene glycol phenyl ether, and dipropylene glycol phenyl ether.

Among the thixotropic agents which are commonly used as hydrogenated castor oil and derivatives thereof and ethyl cellulose. It is, of course, not always necessary to incorporate a thixotropic agent since the solvent resin properties coupled with the shear thinning inherent in any suspension may alone be suitable in this regard. Suitable wetting agents include phosphate esters and soya lecithin.

The ratio of organic medium to solids in the paste dispersions can vary considerably and depends upon the manner in which the dispersion is to be applied and the kind of organic medium used; i.e., determined mainly by the final desired formulation viscosity and print thickness. Normally, to achieve good coverage, the dispersions will contain complementary by weight 40–90% solids and 60–10% organic medium.

It will be recognized that by adjusting the rheological properties of the dispersions of the invention and by changing the solvent component of the organic medium, the invention compositions can be applied to substrates by other methods than casting, e.g., by screen printing. When the compositions are applied by screen printing, the conventional organic media materials used for thick film materials can be used so long as the polymers are completely soluble therein at application temperatures.

The present invention will be described in further detail by giving practical examples. The scope of the present invention, however, is not limited in any way by these practical examples.

Testing Procedures
Softening Temperature (Ts)

Ts was measured herein using a TMA method using a TA Instruments 2940 TMA which compresses a pellet of glass with a force of 0.1N and measures the dimension change of heating at 5C/min. from 25° C. to 700° C. The onset temperature of maximum dimension change is the Ts.

Generally high Ts glasses are more durable in water, acidic and basic solutions that low Ts glasses. High durability is desirable for several reasons. Durable glasses are millable in water; a process inherently lower in cost than jet or solvent milling. They will hold up better in various cleaning solutions used to clean flux after solder is applied to the exposed metal areas of the underlying circuit.

Acid Stability

A measure of durability is the weight loss on exposure of a fired film to 0.1N HCl for 15 min. Ideally the loss should be zero, but it was found that films losing up to 2% is adequate.

EXAMPLES

Example 1

A glass was prepared by melting at 1100° C. ingredients: 144 g of $Bi_2O_3$, 23.7 g $SiO_2$, 34.48 g of $H_3BO_3$ and 18.93 g of $Al_2O_3$ $3H_2O$. The resulting glass in wt %: 72.21 $Bi_2O_3$, 11.88 $SiO_2$, 9.72 $B_2O_3$, 6.19 $Al_2O_3$ and 0 ZnO was ball milled in water to an average particle size of 3.12 microns. The Ts of the glass was 557°. A thick film paste was prepared with both amorphous silica and crystalline alumina expansion filler, and $Cr_2O_3$ colorant. The paste composition was by wt %: 62.1 glass, 6.7 $SiO_2$, 12.0 $Al_2O_3$, 0.7 $Cr_2O_3$ and 18.5 of printing vehicle composed of ethyl cellulose and terpineol.

The paste was printed on alumina substrates and fired in a belt furnace with a peak temperature of 600°–620° C. to form a dense glaze suitable for encapsulation of thick film microcircuits. In the acid stability test a 0.76% weight loss was recorded.

Examples 2–8

The glasses were ball milled and paste compositions were prepared as described in Example 1 and tested for acid stability and the softening temperatures were recorded. All amounts in Table 2 are presented in wt. %.

TABLE 2

| Composition | 2 | 3 | 4 | 5 | 6 | 7 (comparative) | 8 (comparative) |
|---|---|---|---|---|---|---|---|
| $Bi_2O_3$ | 72.0 | 74.8 | 72.0 | 72.0 | 69.6 | 66.8 | 72.0 |
| $SiO_2$ | 10.0 | 6.4 | 10.0 | 10.0 | 13.0 | 10.0 | 10.0 |
| $B_2O_3$ | 9.0 | 8.4 | 5.4 | 11.7 | 8.7 | 8.6 | 11.7 |
| $Al_2O_3$ | 9.0 | 9.3 | 9.0 | 6.3 | 8.7 | 1.8 | 1.8 |
| ZnO | 0.0 | 0.0 | 3.6 | 0.0 | 0.0 | 12.8 | 4.5 |
| Acid stability, % loss | 0.5 | 1.0 | 1.1 | 0.5 | 0.0 | 12.0 | 3.8 |
| Softening temp. Ts (°C.) | 564 | 540 | 556 | 548 | 583 | 539 | 536 |

The data in Table 2 shows that when low or zero ZnO is used in combination with a high amount of $Al_2O_3$ satisfactory acid stability was achieved. In comparative Examples 7 and 8 it was shown that high ZnO used in combination with low $Al_2O_3$ unsatisfactory acid stability was recorded.

Example 6 shows, with increased $SiO_2$, improved acid durability but increased Ts which is above the preferred ranges, but if greater acid durability is needed, glass with a higher $SiO_2$ content can be used.

What is claimed is:

1. A lead-free and cadmium-free glass composition comprising by weight %, basis total composition, 60–80% $Bi_2O_3$, 6–14% $SiO_2$, 5–12% $B_2O_3$, 5–10% $Al_2O_3$ and 0–4% ZnO.

2. The composition of claim 1 containing 6–12% $SiO_2$.

3. The composition of claim 1 wherein the softening temperature is not greater than 590° C.

4. The composition of claim 2 wherein the softening temperature is not greater than 570° C.

5. The composition of claim 1 containing 63–75% $Bi_2O_3$, 9–12% $SiO_2$, 8–11% $B_2O_3$, 6–8% $Al_2O_3$ and 0–2% ZnO.

6. A thick film composition comprising finely divided particles of the glasses of claim 1 dispersed in an organic medium.

7. The composition of claim 6 further comprising 5–20 wt % expansion modifiers selected from $SiO_2$, $Al_2O_3$ and mixtures thereof.

8. The composition of claim 6 further comprising 0.5–2% $Cr_2O_3$.

* * * * *